Patented Feb. 5, 1929.

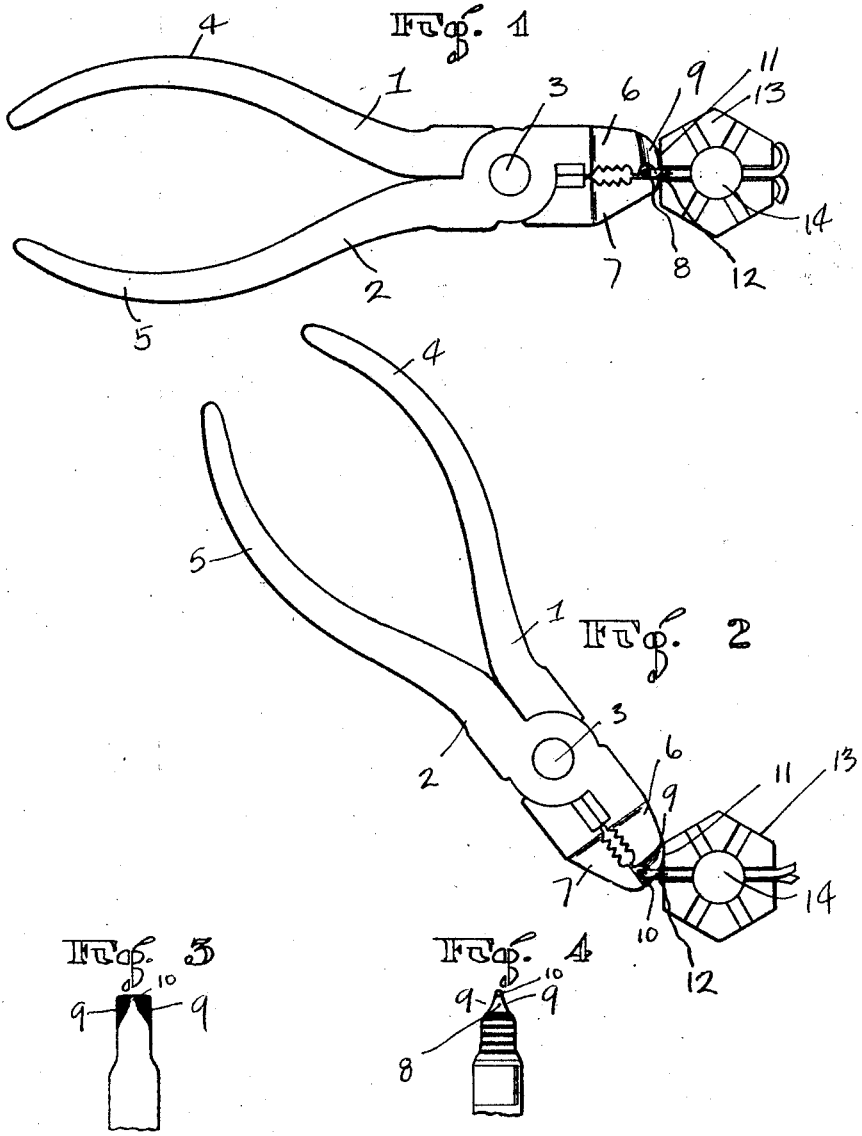

1,701,052

UNITED STATES PATENT OFFICE.

LOUIS J. OSBORNE, OF CONTRA COSTA COUNTY, CALIFORNIA.

COTTER-PIN EXTRACTOR.

Application filed March 23, 1926. Serial No. 96,736.

This invention relates particularly to an improved device for extracting cotter pins from nuts, bolts and the like.

An object of the invention is to provide a pair of handle members cross pivoted together to have complementary jaws that are adapted to receive the looped end of a cotter pin therein to facilitate extraction of said cotter pin from locked position within a bolt nut or the like.

A further object of the invention comprises a cotter pin extractor that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

In the accompanying one sheet of drawings

Fig. 1 represents a plan view of a device for extracting cotter pins constructed in accordance with my invention.

Fig. 2 is a plan view similar to Fig. 1 showing the device in operative position.

Fig. 3 is an exterior view of the hook-shaped jaw to engage the cotter pin.

Fig. 4 is an interior view of Fig. 3.

In the automotive industry it has become almost the universal practice to use castellated nuts and locking cotter pins to the exclusion of any other type of nut. The cotter pins are usually placed within the nut castellations in such a manner as to resist removal by any standard type of tool. Pincers or pliers are the most effective tool to grasp the looped end of the cotter pins with in order to extract the same from the locking position in the castellations of a nut. However, the position of the looped end of the cotter pin may be such that the same cannot be effectively gripped by the pincers. In my invention, I have provided on an ordinary pair of pincers, a special type of jaw that is adapted to engage the looped end of a cotter pin in a positive and secure manner, and to extract the same.

In detail, the construction illustrated in the drawings comprises a pincers or pliers formed of a pair of crossed bars 1 and 2 pivoted together at 3 to form handles 4 and 5 on the ends thereof, and the complementary jaws 6 and 7 on the opposite ends thereof. The jaw 6 has a portion of its inner face cut away as at 8 and the opposite sides 9 thereof ground down so as to provide a hook-shaped end 10 on said jaw, said hook having a roughened protuberance spaced rearwardly from the end thereof to provide a semi-circular notch between the roughened part and the hook shaped end. The hook end 10 of the jaw 6 is adapted to approximate contact with the matching jaw 7. The exterior of the hook-shaped end 10 is provided with an eccentric or fulcrum surface 11 thereon.

A cotter pin would be extracted from a nut by using my invention in the following manner. The hook-shaped end 10 of the extractor to be engaged with the looped end 12 of the cotter pin, and the matching jaw 7 to be closed onto the opposite side of the cotter pin head as shown in Fig. 1. The cotter pin is confined within the castellations of the nut 13 that is screwed onto the bolt 14. The operator would then move the extracting device laterally to bring the fulcrum surface 11 on the exterior of the hook jaw 10 into contact with the flat side of the nut 13. The fulcrum surface 11 would permit the operator to exert a powerful leverage through the handles, to draw or extract the cotter pin from its locked position, until the head thereof would be free enough to permit of a direct twisting pull on the cotter pin. I have found that by using my device it is unnecessary to straighten the ends of the cotter pin which are usually bent over so as to prevent the said pin from working its way out of the nut castellations. My cotter pin extractor grips the looped end of the cotter pin very securely, and the raised surface adjacent the said jaw permits of a tremendous leverage to be used in starting the removal of cotter pins that might otherwise resist removal with other instruments.

Having thus described this invention, what I now claim and desire to secure by Letters Patent is:

A cotter pin extractor comprising in combination a pair of cross pivoted levers having handles and a pair of opposed jaws of substantially equal length, one of said jaws terminating in a relatively small pointed hook end of lesser width than the other jaw and having a blunt roughened protuberance spaced therefrom, said protuberance and hook-shaped end providing a semi-circular notch therebetween having a diameter substantially equal to the diameter of a small wire; the other of said jaws having a flat end, adapted to engage said semicircular notch and contact with said blunt protuberance and hook-shaped end, there being a fulcrum surface on the rear face of one of said jaws to assist in the movement of any article held between the jaws.

In testimony whereof, I have hereunto set my hand at San Francisco, California, this 19th day of March, 1926.

LOUIS J. OSBORNE.